US010048786B2

(12) United States Patent
Ahn et al.

(10) Patent No.: US 10,048,786 B2
(45) Date of Patent: Aug. 14, 2018

(54) DISPLAY DEVICE HAVING BENT CIRCUIT BOARD AND PORTABLE TERMINAL HAVING THE SAME

(71) Applicant: SAMSUNG DISPLAY CO., LTD., Yongin-si, Gyeonggi-Do (KR)

(72) Inventors: Hyeong-Cheol Ahn, Seoul (KR); Won-il Lee, Cheonan-si (KR); Byughoon Chae, Cheonan-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/924,747

(22) Filed: Oct. 28, 2015

(65) Prior Publication Data

US 2016/0266690 A1 Sep. 15, 2016

(30) Foreign Application Priority Data

Mar. 10, 2015 (KR) ........................ 10-2015-0033352

(51) Int. Cl.
*G06F 3/041* (2006.01)
*G06F 1/16* (2006.01)

(52) U.S. Cl.
CPC .............. *G06F 3/0412* (2013.01); *G06F 1/16* (2013.01); *G06F 1/1637* (2013.01); *G06F 2203/04102* (2013.01)

(58) Field of Classification Search
CPC ........ G06F 3/0412; G06F 1/1637; G06F 1/16; G06F 2203/04102
See application file for complete search history.

(56) References Cited

U.S. PATENT DOCUMENTS

| 8,243,424 | B1 | 8/2012 | Babu et al. |
| 8,830,195 | B2 * | 9/2014 | Eom ..................... H01L 27/323 |
| | | | 345/173 |
| 9,535,522 | B2 * | 1/2017 | Ahn ........................ G06F 3/041 |
| 2010/0271329 | A1 * | 10/2010 | Oohira ................ G02F 1/13338 |
| | | | 345/174 |
| 2013/0106813 | A1 | 5/2013 | Hotelling et al. |
| 2014/0028583 | A1 * | 1/2014 | Cho ........................ G06F 3/041 |
| | | | 345/173 |

(Continued)

FOREIGN PATENT DOCUMENTS

| JP | 2011-209590 A | 10/2011 |
| JP | 2011-247959 A | 12/2011 |

(Continued)

OTHER PUBLICATIONS

European Search Report dated Aug. 22, 2016 in Corresponding European Patent Application No. 16155894.5.

*Primary Examiner* — Kwang-Su Yang
(74) *Attorney, Agent, or Firm* — Lee & Morse P.C.

(57) ABSTRACT

A display device, including a display panel that displays an image; a flexible printed circuit board including an attaching part attached to one end of the display panel and a curved part extending from the attaching part and not overlapping with the display panel; a window assembly on an upper surface of the display panel; an adhesive part between the window assembly and the display panel to couple the display panel and the window assembly; and a compensating part not overlapping with the display panel, overlapping with the curved part, and on a same layer as the attaching part.

28 Claims, 17 Drawing Sheets

(56) References Cited

U.S. PATENT DOCUMENTS

| | | | |
|---|---|---|---|
| 2014/0043292 A1* | 2/2014 | Hashimoto | G06F 3/0418 345/174 |
| 2014/0063393 A1* | 3/2014 | Zhong | G02F 1/13306 349/42 |
| 2016/0113106 A1* | 4/2016 | Kim | H05K 1/028 361/749 |
| 2017/0222178 A1* | 8/2017 | Kang | H01L 51/5237 |

FOREIGN PATENT DOCUMENTS

| | | |
|---|---|---|
| KR | 10-2012-0075165 A | 7/2012 |
| KR | 10-2014-0116689 A | 10/2014 |
| KR | 10-2014-0122879 A | 10/2014 |
| KR | 10-2014-0145463 A | 12/2014 |

\* cited by examiner

DISPLAY DEVICE HAVING BENT CIRCUIT BOARD AND PORTABLE TERMINAL HAVING THE SAME

CROSS-REFERENCE TO RELATED APPLICATION

Korean Patent Application No. 10-2015-0033352, filed on Mar. 10, 2015, in the Korean Intellectual Property Office, and entitled: "Display Device and Portable Terminal," is incorporated by reference herein in its entirety.

BACKGROUND

1. Field

The present disclosure relates to a display device and a portable terminal.

2. Description of the Related Art

A display device may include a display panel, a driving circuit board driving the display panel, and a flexible printed circuit board electrically connecting the display panel and the driving circuit board.

SUMMARY

Embodiments may be realized by providing a display device, including a display panel that displays an image; a flexible printed circuit board including an attaching part attached to one end of the display panel and a curved part extending from the attaching part and not overlapping with the display panel; a window assembly on an upper surface of the display panel; an adhesive part between the window assembly and the display panel to couple the display panel and the window assembly; and a compensating part not overlapping with the display panel, overlapping with the curved part, and on a same layer as the attaching part.

A first surface of the compensating part may be coupled to the window assembly, and a second surface of the compensating part, which faces the first surface, may be exposed to air and faces the curved part.

The display device may further include a connecting part between the adhesive part and the compensating part to connect the adhesive part and the compensating part, the connecting part overlapping with the attaching part when viewed in a plan view. The adhesive part, the connecting part, and the compensating part may be integrally formed as a single unit.

The adhesive part, the connecting part, and the compensating part may be an optically clear adhesive film.

The curved part may include a first curved part that is closer to the window assembly as a distance from the display panel increases; and a second curved part that is farther away from the window assembly as the distance from the display panel increases, and the compensating part overlapping with one or more of the first curved part or the second curved part when viewed in plan view.

A first distance between the attaching part and the connecting part may be greater than a second distance between the first curved part and the compensating part.

A boundary part at which the first curved part meets the second curved part may be attached to the compensating part.

The curved part further may include a third curved part between the first curved part and the second curved part, and the third curved part may be attached to the compensating part.

The compensating part may include a non-adhesive material.

The compensating part may include a same material as the adhesive part.

The compensating part may be spaced apart from the adhesive part.

A shortest distance between the curved part and the compensating part may be smaller than a distance between the attaching part and the window assembly.

The compensating part may be spaced apart from the curved part.

The compensating part may have a thickness equal to or greater than a thickness of the adhesive part.

The window assembly may include a window member; and a touch panel between the window member and the display panel, a first surface of the adhesive part may be attached to the touch panel, and a second surface of the adhesive part may be attached to the display panel.

The display panel may include a base substrate; a pad part on one surface of the base substrate and electrically connected to the flexible printed circuit board; an organic light emitting diode layer on the base substrate; an encapsulation layer sealing the organic light emitting diode layer to expose the pad part; and a touch part on the encapsulation layer, and the adhesive part may be between the window assembly and the touch part to couple the display panel and the window assembly.

The display panel may further include an optical member facing the window assembly, and the adhesive part may be between the optical member and the window assembly to couple the display panel and the window assembly.

Embodiments may be realized by providing a portable terminal, including a display panel; a flexible printed circuit board attached to one end of the display panel and bent to a rear surface of the display panel; a window assembly on an upper surface of the display panel; an adhesive part between the display panel and the window assembly to couple the display panel and the window assembly; and a compensating part coupled to the surface of the window assembly, to which the adhesive part is attached, the compensating part facing the flexible printed circuit board, a distance between the compensating part and the flexible printed circuit board changing with a distance from the display panel.

The flexible printed circuit board may be spaced apart from the compensating part.

The compensating part and the adhesive part may be connected to each other to have a single unit shape.

The compensating part may not be overlapping with the display panel when viewed in a plan view.

Embodiments may be realized by providing a display device, including a display panel; a flexible printed circuit board attached to one end of the display panel and bent to a rear surface of the display panel; a touch panel on the display panel; a window member on the touch panel; and an adhesive film between the display panel and the touch panel, the adhesive film being attached to one surface of the touch panel and extending from a region in which the touch panel is overlapping with the display panel to a region in which the touch panel is not overlapping with the display panel to overlap with the flexible printed circuit board.

A distance between the flexible printed circuit board and the adhesive film may change with a distance from the display panel.

A portion of the flexible printed circuit board, which is not overlapping with the display panel when viewed in a plan view, may be attached to the adhesive film.

The flexible printed circuit board may be spaced apart from the adhesive film.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
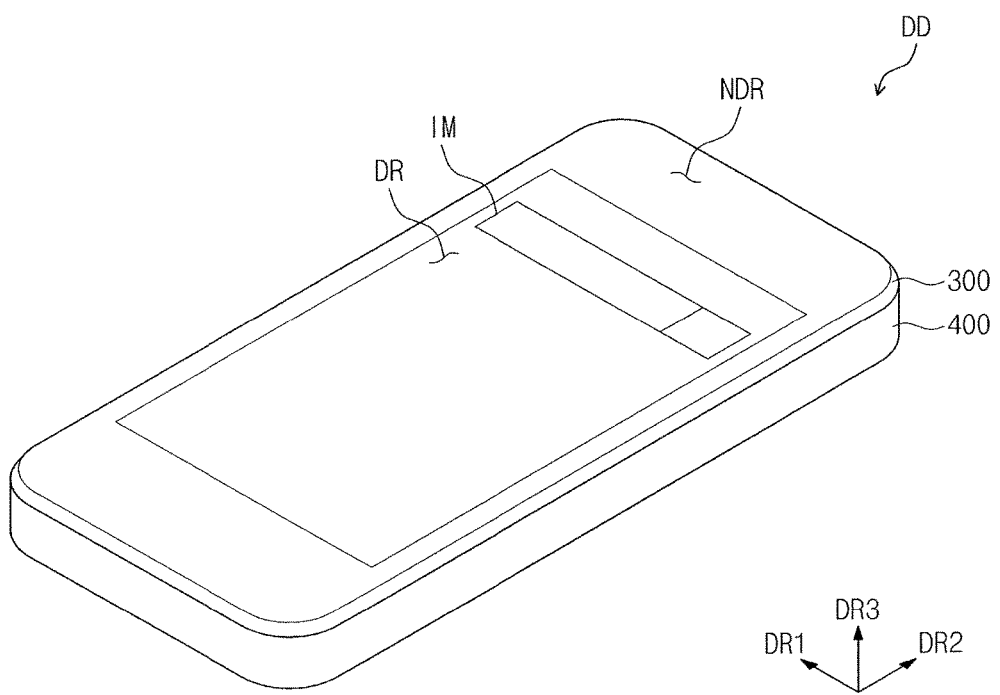
FIG. 1 illustrates a perspective view of a display device according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer or section. It will be understood that when an element or layer is referred to as being "on", "connected to" or "coupled to" another element or layer, it can be directly on, connected or coupled to the other element or layer or intervening elements or layers may be present.

FIG. 1 illustrates a perspective view of a display device DD according to an exemplary embodiment of the present disclosure.

FIG. 1 shows a flat portable terminal to which the display apparatus DD according to an exemplary embodiment of the present disclosure may be applied as a representative example. In an embodiment, the portable terminal may be applied to various display devices, such as, for example, a curved display device, a bent display device, a rollable display device, a foldable display device, or a stretchable display device, according to embodiments. In an embodiment, the display device DD may be applied to a large-sized electronic item, such as, for example, a television set or an outdoor billboard, and a small and medium-sized electronic item, such as, for example, a personal computer, a notebook computer, a personal digital assistant (PDA), a car navigation unit, a game unit, a wrist-type electronic device, or a camera.

The display device DD may include a plurality of regions distinct from each other on a display surface. The display device DD may include a display region DR through which an image IM may be displayed and a non-display region NDR disposed adjacent to the display region DR. The display surface, through which the image IM may be displayed, may be substantially parallel to a surface defined by a first direction DR1 and a second direction DR2, and a normal line direction of the display surface is referred to as a third direction DR3. In an embodiment, the third direction DR3 may serve as a reference direction to divide a front surface and a rear surface of each member.

Figure 2:
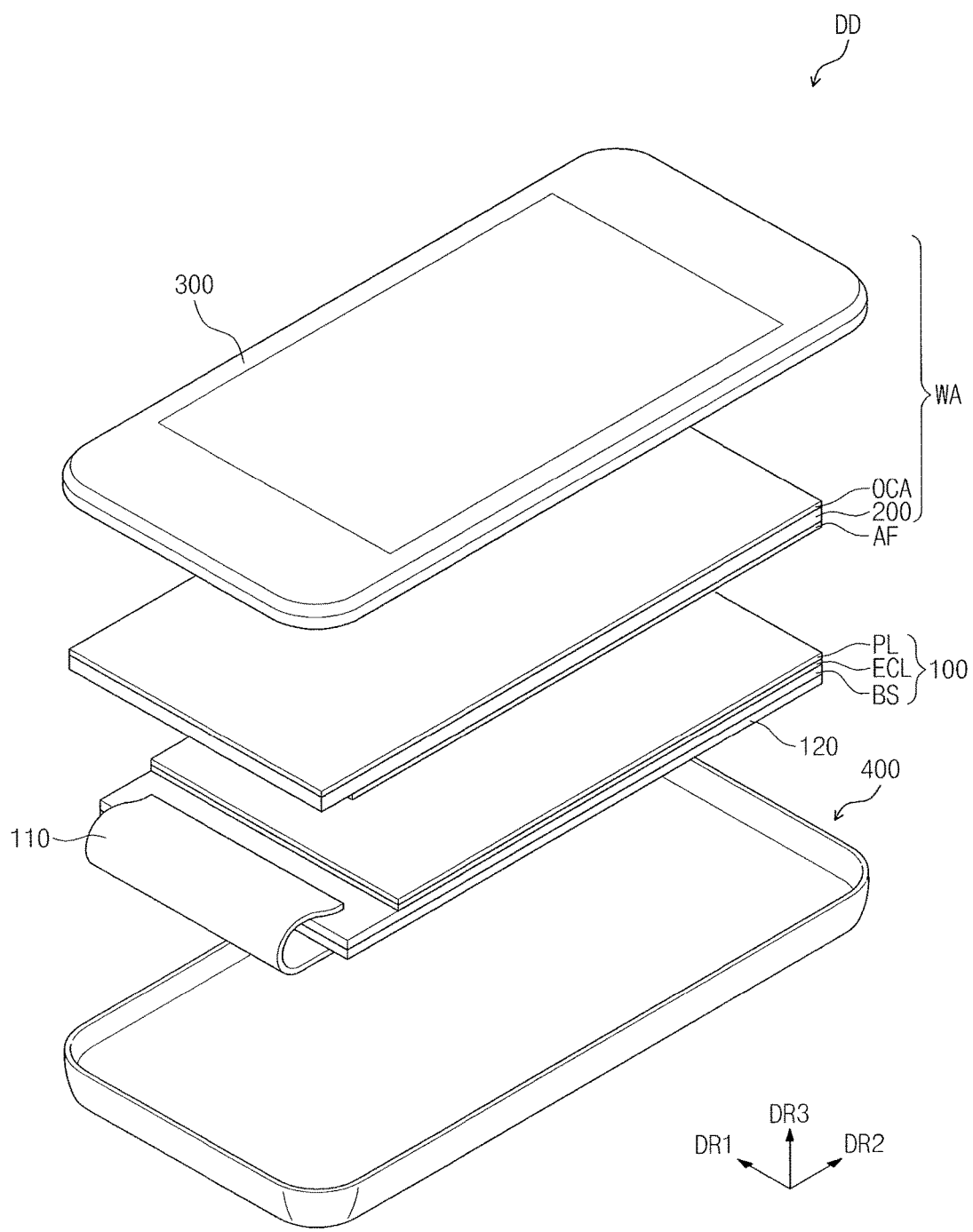
FIG. 2 illustrates an exploded perspective view of a display device according to an exemplary embodiment of the present disclosure.
Figure 3:
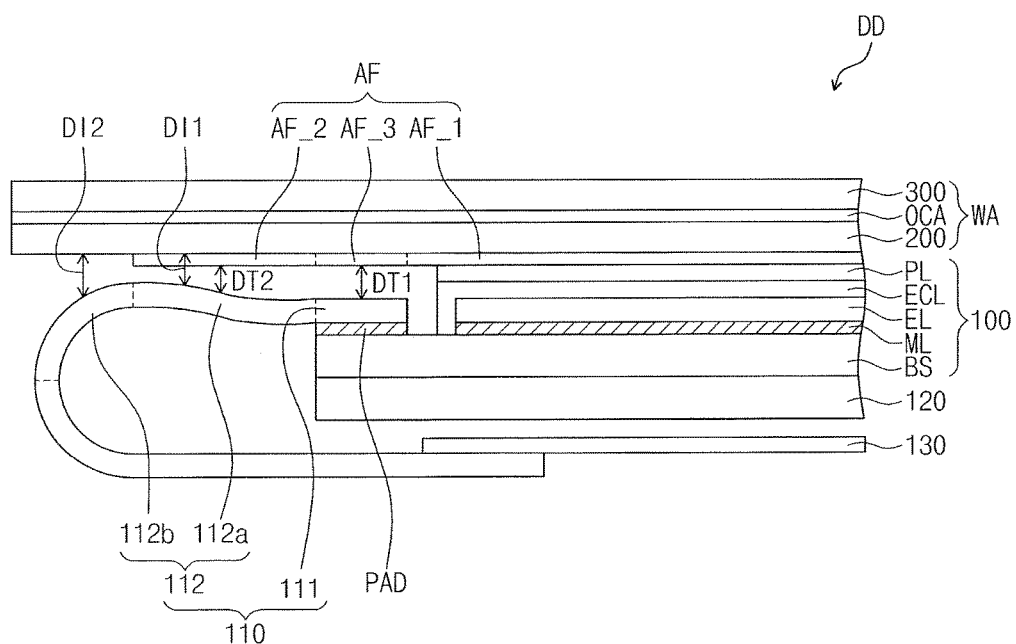
FIG. 3 illustrates a cross-sectional view of a display device according to an exemplary embodiment of the present disclosure.
Figure 4:
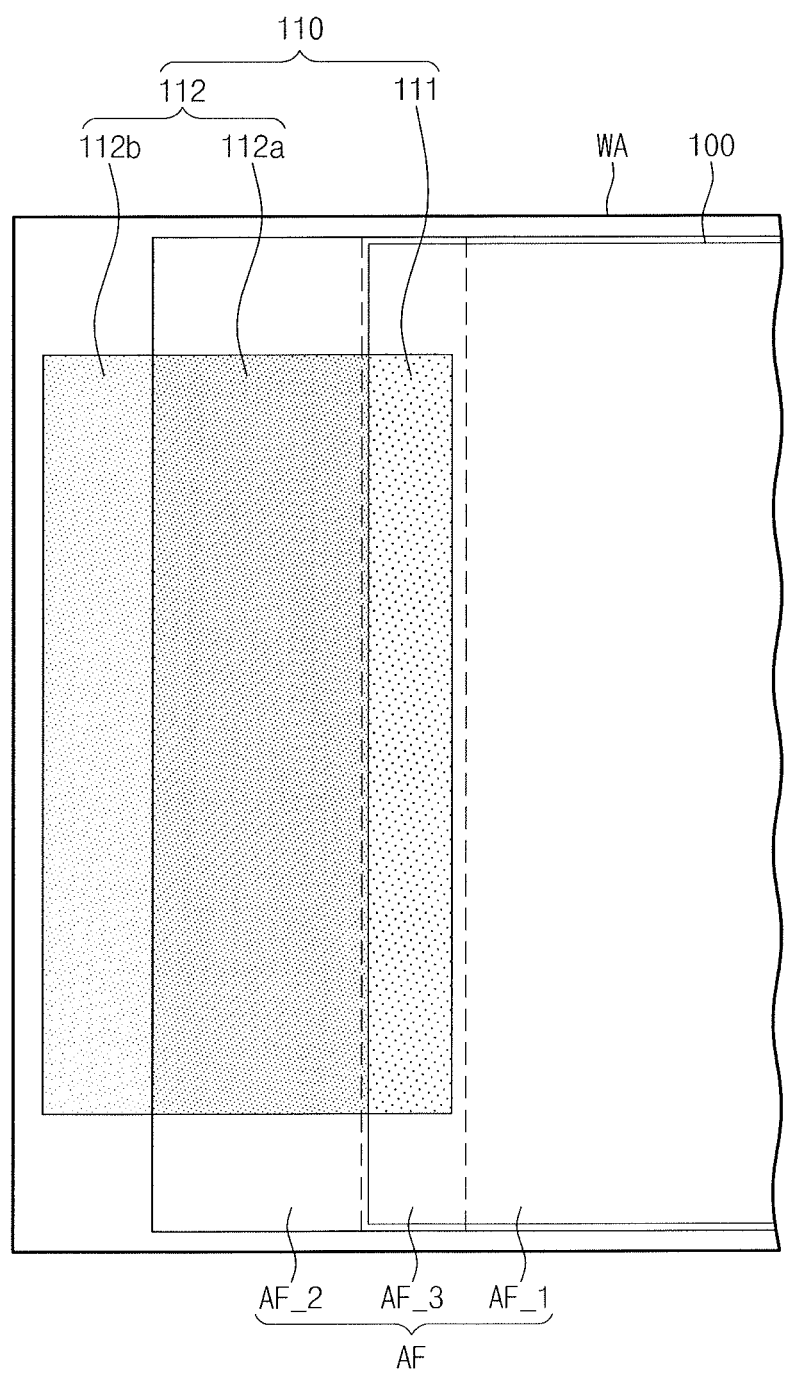
FIG. 4 illustrates a plan view of the display device shown in FIG. 3.

FIG. 2 illustrates an exploded perspective view of the display device DD according to an exemplary embodiment of the present disclosure, FIG. 3 illustrates a cross-sectional view of the display device DD according to an exemplary embodiment of the present disclosure, and FIG. 4 illustrates a plan view of the display device DD shown in FIG. 3.

Referring to FIGS. 2, 3, and 4, the display device DD may include a display panel 100, a flexible printed circuit board 110, a protective member 120, a driving circuit board 130, a window assembly WA, an adhesive film AF, and a cover member 400.

The display panel 100 may generate an image corresponding to image data applied thereto. The display panel 100 may be various display panels, such as, for example, an organic light emitting display panel, a liquid crystal display panel, a plasma display panel, an electrophoretic display panel, or an electrowetting display panel. In the present exemplary embodiment, an organic light emitting display panel will be described as the display panel 100.

The display panel 100 may include a base substrate BS, a circuit layer ML, an organic light emitting diode layer EL, an encapsulation layer ECL, a pad part PAD, and an optical member PL.

The base substrate BS may include one or more of a glass substrate, a sapphire substrate, or a plastic substrate. The circuit layer ML, the organic light emitting diode layer EL, the encapsulation layer ECL, the pad part PAD, and the optical member PL may be disposed above the base substrate BS.

The circuit layer ML may include a plurality of signal lines and a plurality of electronic devices, which may be included in the display panel 100. For example, the circuit layer ML may include gate lines, data lines, and thin film transistors respectively corresponding to pixels.

The organic light emitting diode layer EL may generate lights having colors corresponding to luminous substances. In an embodiment, the colors may include red, green, blue, and white colors.

The encapsulation layer ECL may include a thin film encapsulation layer (TFE), i.e., a plurality of inorganic thin film layers and a plurality of organic thin film layers. The encapsulation layer ECL may cover the organic light emitting diode layer EL and may block external moisture and air to protect the organic light emitting diode layer EL. In the present exemplary embodiment, the encapsulation layer ECL may be replaced with an encapsulation substrate. The encapsulation substrate may be disposed to be spaced apart from the base substrate BS such that the organic light emitting diode layer EL may be disposed between the encapsulation substrate and the base substrate BS. The encapsulation substrate and the base substrate BS may be coupled to each other by a sealant formed along an edge of the base substrate BS.

The pad part PAD may include pads corresponding to signal lines electrically connected to the pixels in a one-to-one correspondence and electrically connected to the signal lines. The pad part PAD may be electrically connected to the flexible printed circuit board 110 and may receive signals used to drive the display panel 100 from the driving circuit board 130.

The optical member PL may include one or more of a retardation plate or a polarizing plate. When the optical member PL includes the retardation plate and the polarizing plate, the polarizing plate may be disposed above the retardation plate. An external light incident to the window assembly WA may be linearly polarized while passing through the polarizing plate. The linearly-polarized light may be reflected after passing through the retardation plate and incident to the polarizing plate after passing again through the retardation plate. The linearly-polarized light may be circularly polarized to have a phase difference of about 45 degrees while passing through the retardation plate. As a result, the external light may not pass through the polarizing plate after passing again through the retardation plate, and may become extinct. For example, a right circularly polarized light after passing through the retardation plate may be transformed into a left circularly polarized light after being reflected and the right circularly polarized light may destructively interfere with the left circularly polarized light, and the external light may become extinct. Accordingly, a reflectance of the display device DD with respect to the external light may be reduced. The optical member PL may be omitted according to embodiments.

The flexible printed circuit board 110 may be attached to one end of the display panel 100 and bent to a rear surface of the display panel 100. The flexible printed circuit board 110 may include an attaching part 111 that may be attached to the one end of the display panel 100 and a curved part 112 extending from the attaching part 111. The attaching part 111 may be electrically connected to the pad part PAD and may apply signals to the display panel 100. A data driving chip may be mounted on one surface of the flexible printed circuit board 110. The data driving chip may generate data signals, which may be applied to data lines DL (refer to FIG. 16) of the display panel 100, in response to an external signal.

The curved part 112 may not be overlapping with the display panel 100 when viewed in a plan view. For example, a region of the flexible printed circuit board 110, which may extend farther away from the display panel 100 and may face the window assembly WA, may correspond to the curved part 112.

The curved part 112 may include a first curved part 112a and a second curved part 112b. A distance DI1 between the first curved part 112a and the window assembly WA may decrease as the first curved part 112a becomes farther away from the display panel 100, e.g., a distance DI1 between the first curved part 112a and the window assembly WA may decrease along the first curved part 112a in a direction away from the display panel 100. A distance DI2 between the second curved part 112b and the window assembly WA may increase as the second curved part 112b becomes farther away from the display panel 100, e.g., a distance DI2 between the second curved part 112b and the window assembly WA may increase along the second curved part 112b in direction away from the display panel 100. The first and second curved parts 112a and 112b may be distinct from each other as viewed relative to the shape in which the flexible printed circuit board 110 is bent to the rear surface of the display panel 100. According to an embodiment, the distance DI1 between the first curved part 112a and the window assembly WA may be constant even though the first curved part 112a becomes farther away from the display panel 100, e.g., the distance DI1 between the first curved part 112a and the window assembly WA may be constant along the first curved part 112a in a direction away from the display panel 100, and the distance DI2 between the second curved part 112b and the window assembly WA may increase even though the second curved part 112b becomes farther away from the display panel 100, e.g., the distance DI2 between the second curved part 112b and the window assembly WA may increase along the second curved part 112b in a direction away from the display panel 100.

The protective member 120 may include one or more of a buffering member or a heat discharge member. The buffering member may include a material with high impact absorption properties. For example, the buffering member may be formed of a polymer resin, e.g., polyurethane, polycarbonate, polypropylene, or polyethylene, or formed from a rubber solution, a urethane-based material, or a sponge obtained by foaming/molding an acrylic-based material.

In an embodiment, the heat discharge member may include one or more of graphite, copper, or aluminum, which may have superior heat discharge properties. The heat discharge member may an electromagnetic wave shielding property or an electromagnetic wave absorbing property.

The driving circuit board 130 may be disposed on the rear surface of the display panel 100. The driving circuit board 130 may be electrically connected to the display panel 100 by the flexible printed circuit board 110. The driving circuit board 130 may apply an image signal displaying the image and a control signal driving the display panel 100 to the display panel 100.

The driving circuit board 130 may include a base substrate and the base substrate may be, for example, a flexible printed circuit board. In this case, the base substrate may be, for example, a flexible plastic board, e.g., polyimide or polyester.

The window assembly WA may be disposed on an upper surface of the display panel 100. The window assembly WA may include a touch panel 200, a window member 300, and an adhesive member OCA.

The touch panel 200 may obtain coordinate information of a touch position. The touch panel 200 may be disposed on the upper surface of the display panel 100. The touch panel 200 may be a resistive type touch panel, an electrostatic capacitive type touch panel, or an electromagnetic induction type touch panel. In the present exemplary embodiment, the touch panel 200 may be the electrostatic capacitive type touch panel. The touch panel 200 may include two kinds of sensors crossing each other. The electrostatic capacitive type touch panel may obtain the coordinate information of the touch position by a self-capacitance method or a mutual capacitance method.

The window member 300 may include a base substrate and a black matrix. The base substrate may be, for example, a silicon substrate, a glass substrate, a sapphire substrate, or a plastic film. The black matrix may be disposed on a rear surface of the base substrate to define a bezel area, i.e., the non-display area NDR (refer to FIG. 1), of the display device DD. The black matrix may be formed by coating a colored organic material. The window member 300 may further include a functional coating layer disposed on a front surface of the base member. The functional coating layer may include, for example, an anti-fingerprint layer, an anti-reflection layer, or a hard coating layer.

The touch panel 200 and the window member 300 may be coupled to each other using the adhesive member OCA. In an embodiment, the adhesive member OCA may include an optically clear adhesive film. For example, the adhesive member OCA may be an optical clear resin.

The adhesive film AF may be disposed between the window assembly WA and the display panel 100. The window assembly WA and the display panel 100 may be coupled to each other by the adhesive film AF. The adhesive film AF may be attached to one surface of the touch panel 200 and may extend from a region in which the touch panel 200 is overlapping with the display panel 100 to a region in which the touch panel 200 is not overlapping with the display panel 100.

The adhesive film AF may include an adhesive part AF_1, a compensating part AF_2, and a connecting part AF_3. When viewed in a plan view, the adhesive part AF_1 may be overlapping with the display panel 100 and may couple the display panel 100 and the window assembly WA. The compensating part AF_2 may be overlapping with the curved part 112 when viewed in a plan view and may compensate for a gap between the window assembly WA and the curved part 112. The compensating part AF_2 may be overlapping with at least a half portion of the flexible printed circuit board 110 not overlapping with the display panel 100. The connecting part AF_3 may be overlapping with the adhesive part AF_1 when viewed in a plan view.

The connecting part AF_3 may be disposed between the adhesive part AF_1 and the compensating part AF_2 and may connect the adhesive part AF_1 and the compensating part AF_2. For example, the adhesive part AF_1, the compensating part AF_2, and the connecting part AF_3 may be integrally formed with each other to form one adhesive film AF. For example, the adhesive film AF may extend to the region in which the touch panel 200 is not overlapping with the display panel 100, and may be overlapping with the curved part 112. The adhesive part AF_1, the compensating part AF_2, and the connecting part AF_3 may have the same thickness.

A first distance DT1 between the attaching part 111 and the connecting part AF_3 may be constant and a distance between the curved part 112 and the compensating part AF_2 may be varied depending on the distance from the display panel 100. In the present exemplary embodiment, the compensating part AF_2 may be overlapping with the first curved part 112a when viewed in a plan view. A second distance DT2 between the first curved part 112a and the compensating part AF_2 may decrease as the distance from the display panel 100 increases. The second distance DT2 may be smaller than the first distance DT1 and a shortest distance between the curved part 112 and the compensating part AF_2 may be smaller than the first distance DT1.

According to the present exemplary embodiment, a portion of the gap between the window assembly WA and the flexible printed circuit board 110 may be easily filled by extending the adhesive film AF without adding a separate material or process. Accordingly, a space in which the flexible printed circuit board 110 may move upward to the display panel 100 may be reduced. Although an external force may be applied to the flexible printed circuit board 110 bent when the cover member 400 is assembled, variations in position and shape of the flexible printed circuit board 110 may be reduced. As a result, defects may be prevented from occurring on the flexible printed circuit board 110 and reliability of the display device DD may be improved.

In the present exemplary embodiment, the adhesive film AF may be the optically clear adhesive film. In an embodiment, the adhesive film AF may be replaced with the optical clear resin.

The cover member 400 may accommodate the display panel 100 and may be coupled to the window assembly WA. The cover member 400 may be manufactured by assembling plural parts or manufactured in a one-body formed by an injection molding process. The cover member 400 may include a plastic or metallic material.

Figure 5:
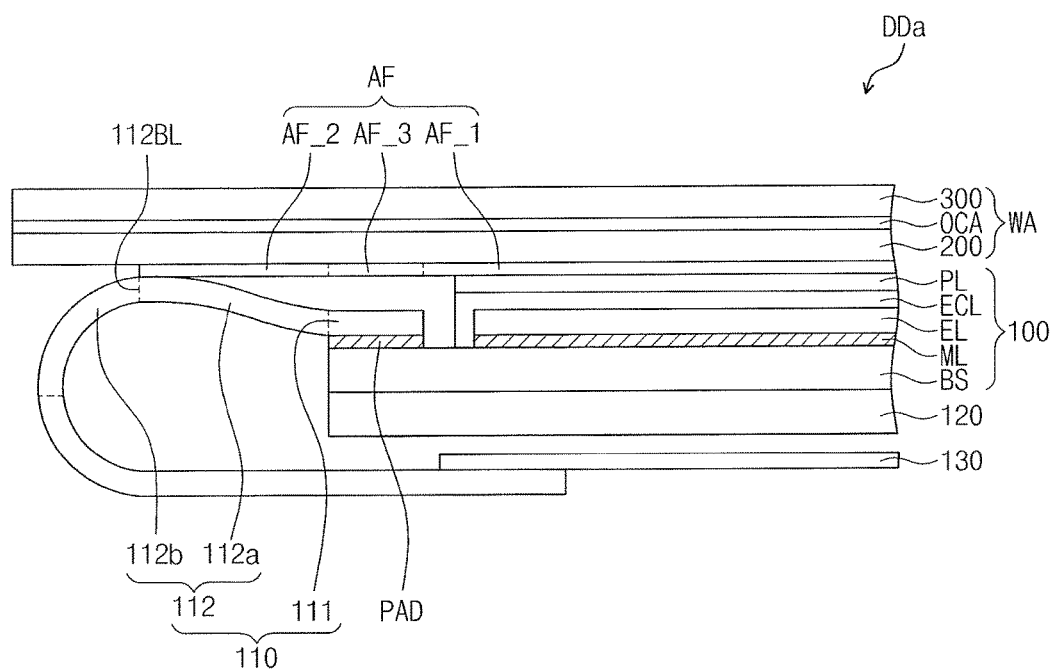
FIG. 5 illustrates a cross-sectional view of a display device according to an exemplary embodiment of the present disclosure.

FIG. 5 illustrates a cross-sectional view of a display device DDa according to an exemplary embodiment of the present disclosure. In FIG. 5, the same reference numerals denote the same elements in FIG. 3, and detailed descriptions of the same elements will be omitted.

Referring to FIG. 5, a boundary part 112BL between the first curved part 112a and the second curved part 112b may be attached to the compensating part AF_2. The boundary part 112BL may be attached to the compensating part AF_2 when the window assembly WA is coupled to the display panel 100.

In the present exemplary embodiment, a portion of the flexible printed circuit board 110 may be attached to the compensating part AF_2, and the position and shape of the flexible printed circuit board 110 may be prevented from being changed even though external force may be applied to the flexible printed circuit board 110 while the cover member 400 (refer to FIG. 1) is assembled. As a result, the attaching part 111 may be prevented from being separated from the pad part PAD due to, for example, the external force, the lines arranged on the flexible printed circuit board 110 may be prevented from being cracked, and reliability of the display device DDa may be improved.

Figure 6:
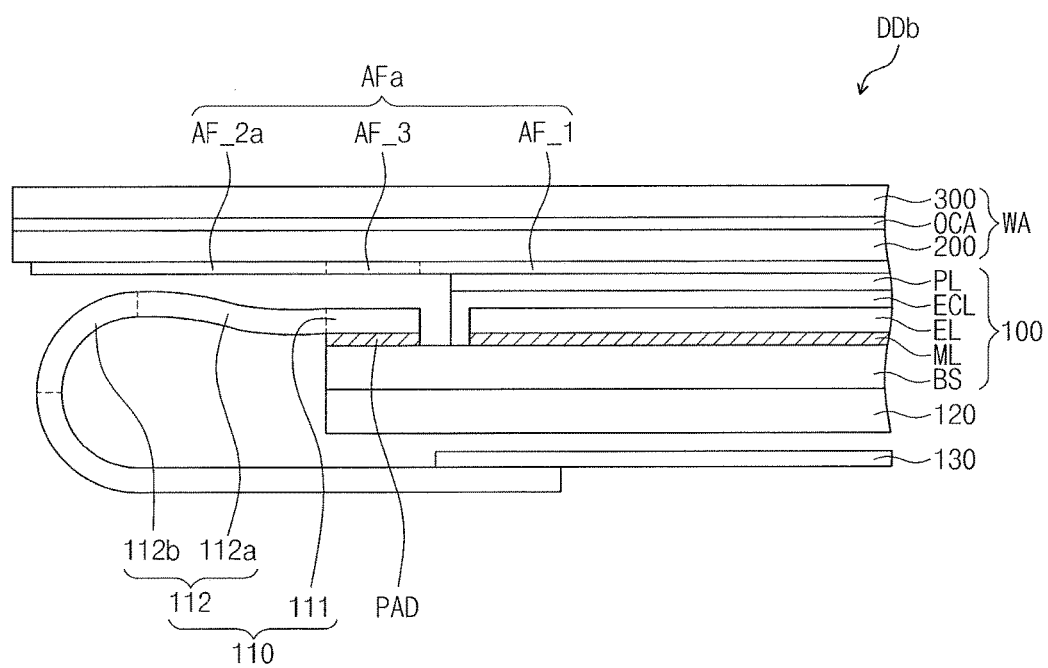
FIG. 6 illustrates a cross-sectional view of a display device according to an exemplary embodiment of the present disclosure.
Figure 7:
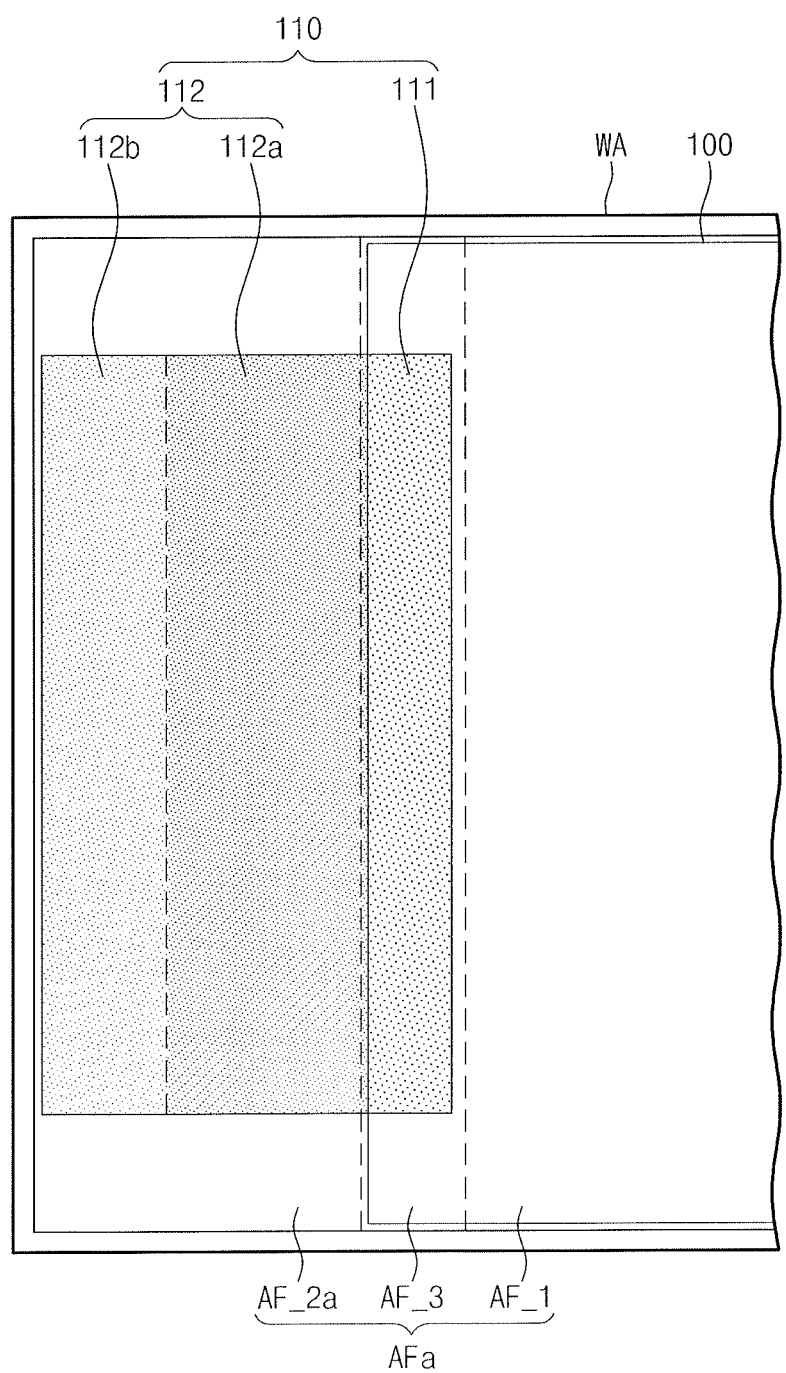
FIG. 7 illustrates a plan view of the display device shown in FIG. 6.

FIG. 6 illustrates a cross-sectional view of a display device DDb according to an exemplary embodiment of the present disclosure and FIG. illustrates is a plan view of the display device DDb shown in FIG. 6. In FIGS. 6 and 7, the same reference numerals denote the same elements in FIG. 3, and detailed descriptions of the same elements will be omitted.

Referring to FIGS. 6 and 7, an adhesive film AFa may include an adhesive part AF_1, a compensating part AF_2a, and a connecting part AF_3. The adhesive part AF_1 may be overlapping with the display panel 100 when viewed in a plan view and may couple the display panel 100 and the window assembly WA. The compensating part AF_2a may be overlapping with the first and second curved parts 112a and 112b when viewed in a plan view and the connecting part AF_3 may be overlapping with the attaching part 111 when viewed in a plan view.

In the present exemplary embodiment, the adhesive film AFa may extend to a region corresponding to an end portion of the bent flexible printed circuit board 110. A portion of the gap between the window assembly WA and the flexible printed circuit board 110 may be filled with the adhesive film AFa. Accordingly, a space in which the flexible printed circuit board 110 may move upward to the display panel 100 may be reduced. As a result, although the external force may be applied to the bent flexible printed circuit board 110, variations in position and shape of the flexible printed circuit board 110 may be reduced, and reliability of the display device DDb may be improved.

Figure 8:
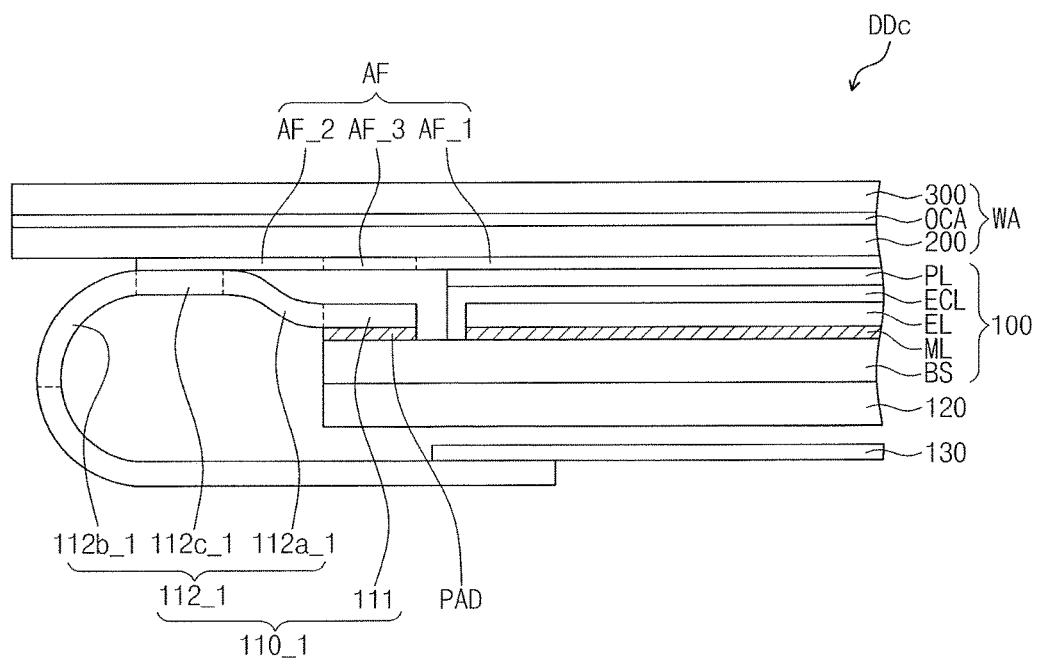
FIG. 8 illustrates a cross-sectional view of a display device according to an exemplary embodiment of the present disclosure.

FIG. 8 illustrates a cross-sectional view of a display device DDc according to an exemplary embodiment of the present disclosure. In FIG. 8, the same reference numerals denote the same elements in FIG. 3, and detailed descriptions of the same elements will be omitted.

Referring to FIG. 8, a flexible printed circuit board 110_1 may be bent to a rear surface of the display panel 100. The flexible printed circuit board 110_1 may include an attaching part 111 attached to the display panel 100 and a curved part 112-1 extending from the attaching part 111 and that may be farther away from the display panel 100.

The curved part 112_1 may include a first curved part 112a_1 closer to the window assembly WA as a distance from the display panel 100 increases, a second curved part 112b_1 farther away from the window assembly WA as a distance from the display panel 100 increases, and a third curved part 112c_1 disposed between the first and second curved parts 112a_1 and 112b_1. The third curved part 112c_1 may be attached to the compensating part AF_2. The third curved part 112c_1 may have substantially a flat shape when viewed from a cross-sectional view.

In the present exemplary embodiment, the third curved part 112c_1 may be attached to the compensating part AF_2, and the flexible printed circuit board 110_1 attached to the display panel 100 may be prevented from moving upward even though the external force may be applied to the bent flexible printed circuit board 110_1. As a result, the attaching part 111 may be prevented from being separated from the pad part PAD due to, for example, the external force, the lines arranged on the flexible printed circuit board 110_1 may be prevented from being cracked, and reliability of the display device DDc may be improved.

Figure 9:
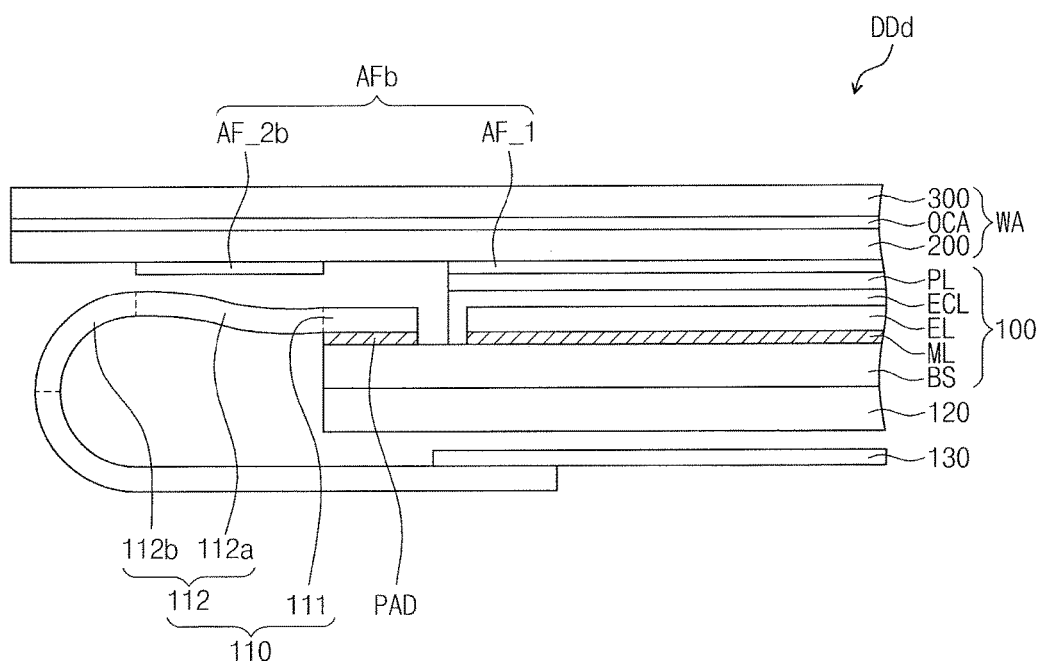
FIG. 9 illustrates a cross-sectional view of a display device according to an exemplary embodiment of the present disclosure.

FIG. 9 illustrates a cross-sectional view of a display device DDd according to an exemplary embodiment of the present disclosure. In FIG. 9, the same reference numerals denote the same elements in FIG. 3, and detailed descriptions of the same elements will be omitted.

Referring to FIG. 9, an adhesive film AFb may include an adhesive part AF_1 and a compensating part AF_2b spaced apart from the adhesive part AF_1. In the present exemplary embodiment, the connecting part AF_3 (refer to FIG. 3) may be omitted as compared to the display device DD shown in FIG. 3.

The compensating part AF_2b may be overlapping with the first curved part 112a and not overlapping with the second curved part 112b when viewed in a plan view. The compensating part AF_2b may compensate for the gap between the flexible printed circuit board 110 and the window assembly WA.

One surface of the compensating part AF_2b may be attached to the window assembly WA and the other surface of the compensation part AF_2b, which faces the one surface, may be exposed to the air.

In the present exemplary embodiment, the compensating part AF_2b may include the same material as that of the adhesive part AF_1. Accordingly, the flexible printed circuit board 110 may be disposed to be spaced apart from the compensating part AF_2b as shown in FIG. 9, but the flexible printed circuit board 110 may be attached to the compensating part AF_2b as shown in FIGS. 5 and 8.

In the present exemplary embodiment, the compensating part AF_2b may be separately provided from the adhesive part AF_1, and the compensating part AF_2b may be deformed. For example, the size and thickness of the compensating part AF_2b may be variously changed in accordance with a gap between the window assembly WA and the flexible printed circuit board 110 and a size of the display device DDd, and the gap between the window assembly WA and the flexible printed circuit board 110 may be filled without directly exerting influence on the thickness of the display device DDd.

Figure 10:
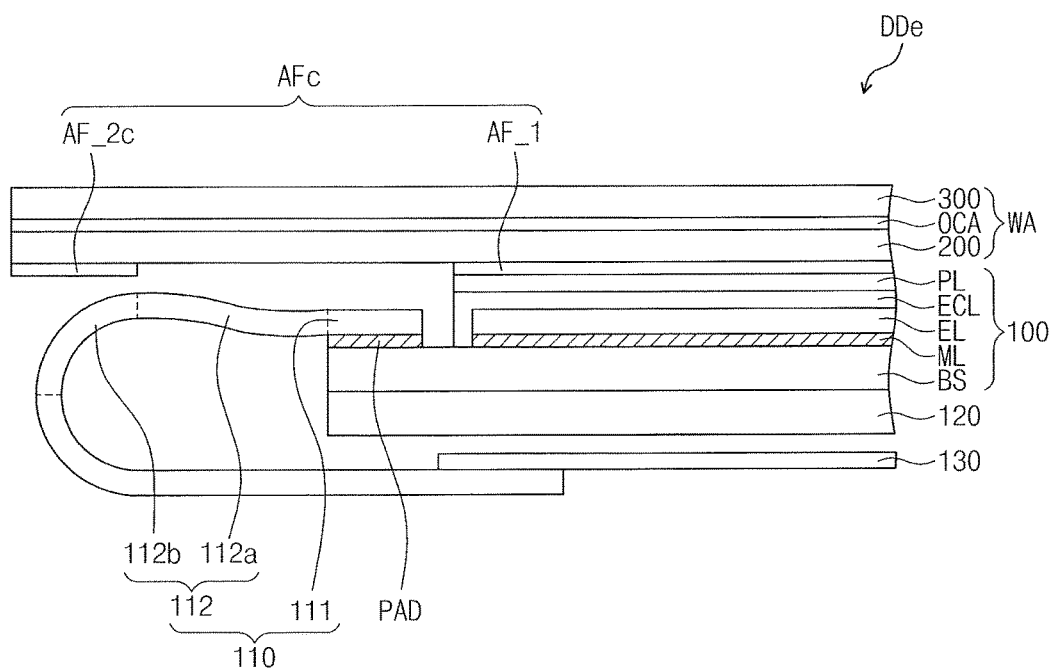
FIG. 10 illustrates a cross-sectional view of a display device according to an exemplary embodiment of the present disclosure.

FIG. 10 illustrates a cross-sectional view of a display device DDe according to an exemplary embodiment of the present disclosure. In FIG. 10, the same reference numerals denote the same elements in FIG. 3, and detailed descriptions of the same elements will be omitted.

Referring to FIG. 10, an adhesive film AFc may include an adhesive part AF_1 and a compensating part AF_2c spaced apart from the adhesive part AF_1.

The compensating part AF_2c may not be overlapping with the first curved part 112a and may be overlapping with the second curved part 112b when viewed in a plan view. The compensating part AF_2c may compensate for the gap between the flexible printed circuit board 110 and the window assembly WA. Accordingly, variations in the position and shape of the flexible printed circuit board 110 may be reduced even though the external force may be applied to the bent flexible printed circuit board 110, and reliability of the display device DDe may be improved.

Figure 11:
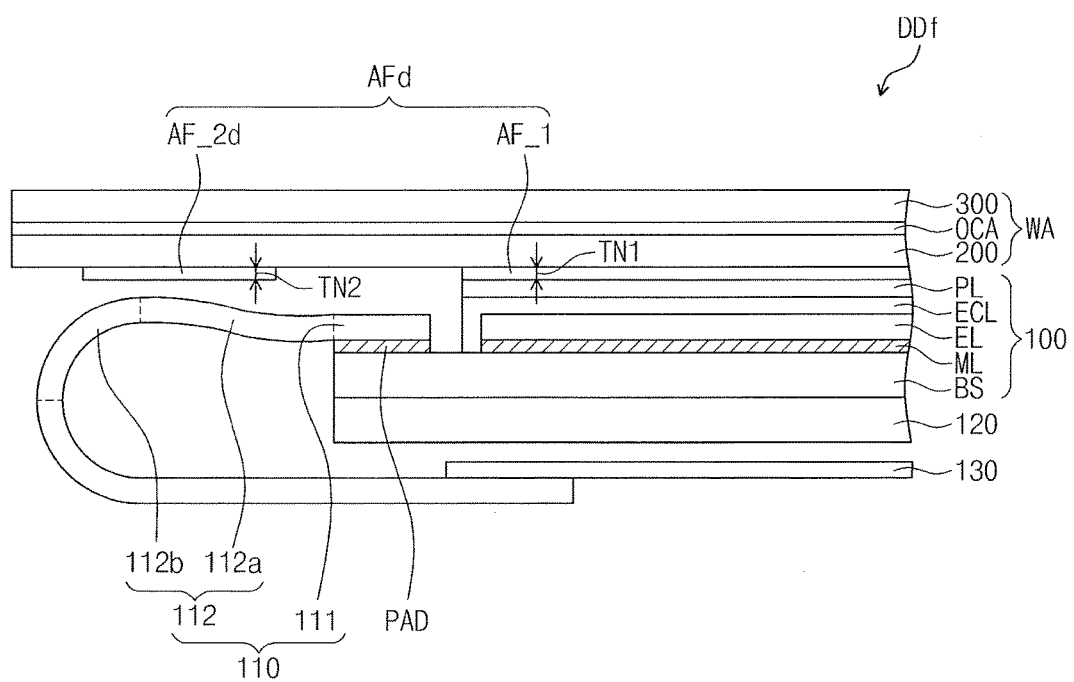
FIG. 11 illustrates a cross-sectional view of a display device according to an exemplary embodiment of the present disclosure.
Figure 12:
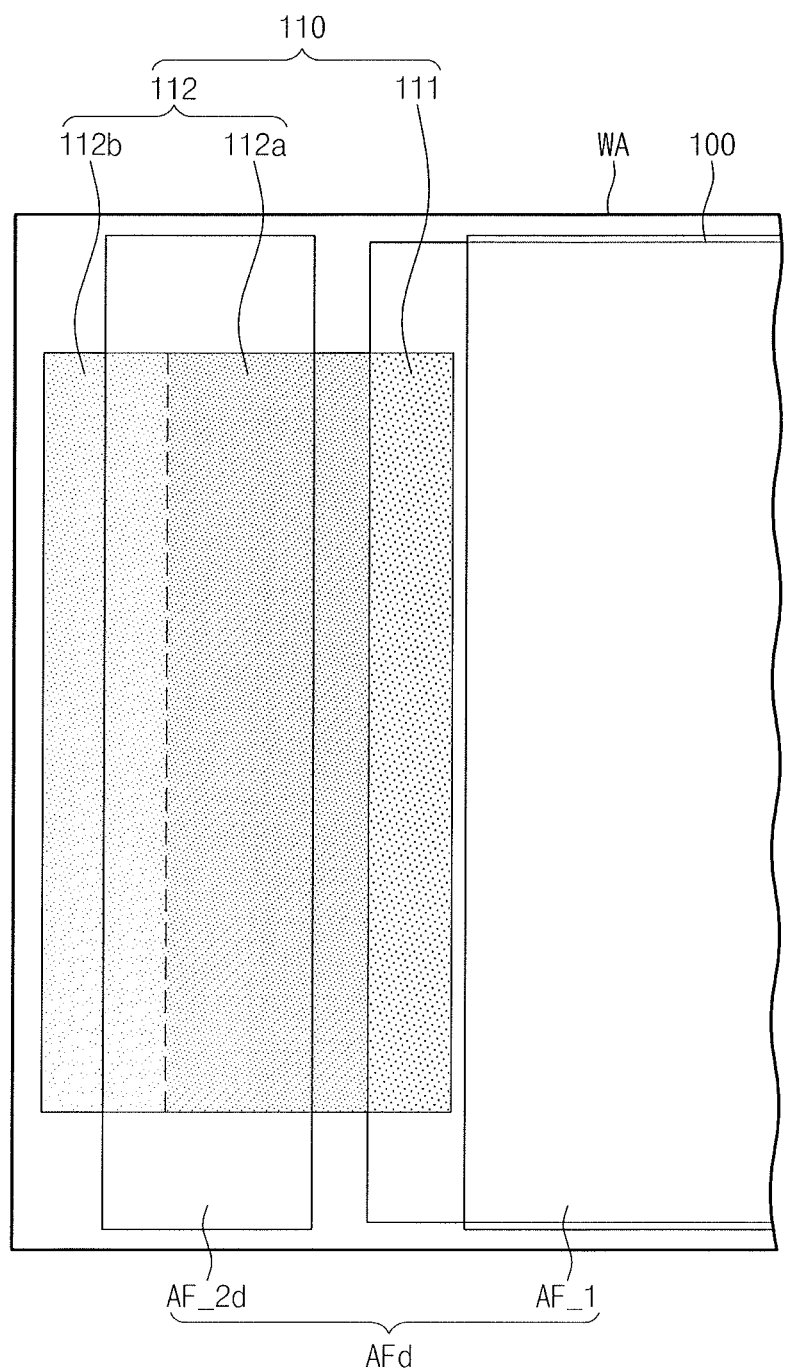
FIG. 12 illustrates a plan view of the display device shown in FIG. 11.

FIG. 11 illustrates a cross-sectional view of a display device DDf according to an exemplary embodiment of the present disclosure and FIG. 12 illustrates a plan view of the display device shown in FIG. 11. In FIGS. 11 and 12, the same reference numerals denote the same elements in FIG. 3, and detailed descriptions of the same elements will be omitted.

Referring to FIGS. 11 and 12, an adhesive film AFd may include an adhesive part AF_1 and a compensating part AF_2d spaced apart from the adhesive part AF_1. The adhesive part AF_1 may have a first thickness TN1 that is equal to a second thickness TN2 of the compensating part AF_2d.

The compensating part AF_2d may be overlapping with the first and second curved parts 112a and 112b. The compensating part AF_2d may compensate for the gap between the flexible printed circuit board 110 and the window assembly WA. Accordingly, variations in the position and shape of the flexible printed circuit board 110 may be reduced even though the external force may be applied to the bent flexible printed circuit board 110, and reliability of the display device DDf may be improved.

Figure 13:
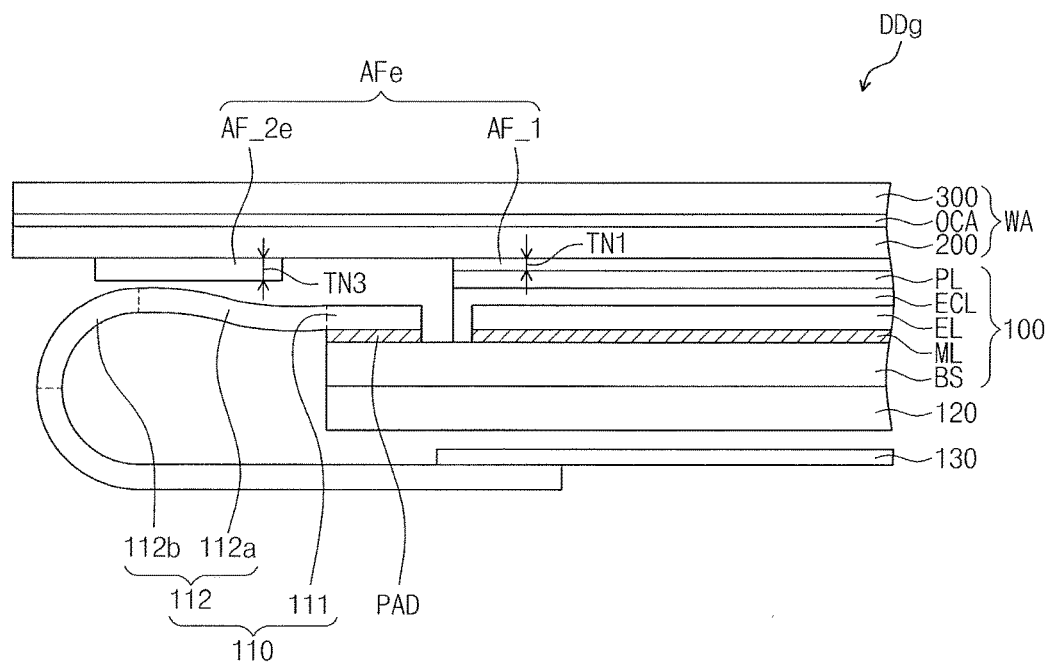
FIG. 13 illustrates a cross-sectional view of a display device according to an exemplary embodiment of the present disclosure.

FIG. 13 illustrates a cross-sectional view of a display device DDg according to an exemplary embodiment of the present disclosure. In FIG. 13, the same reference numerals denote the same elements in FIG. 3, and detailed descriptions of the same elements will be omitted.

Referring to FIG. 13, an adhesive film AFe may include an adhesive part AF_1 and a compensating part AF_2e spaced apart from the adhesive part AF_1. In the present exemplary embodiment, the compensating part AF_2e may have a second thickness TN3 thicker than a first thickness TN1 of the adhesive part AF_1, and the gap between the window assembly WA and the flexible printed circuit board 110 may be reduced by the second thickness TN3. The second thickness TN3 may thicker than the first thickness TN1, and the space in which the flexible printed circuit board 110 may move may be reduced more than when the second thickness TN3 is equal to the first thickness TN1. As a result, variations in the position and shape of the flexible printed circuit board 110 may be reduced even though the external force may be applied to the bent flexible printed circuit board 110, and reliability of the display device DDg may be improved.

Figure 14:
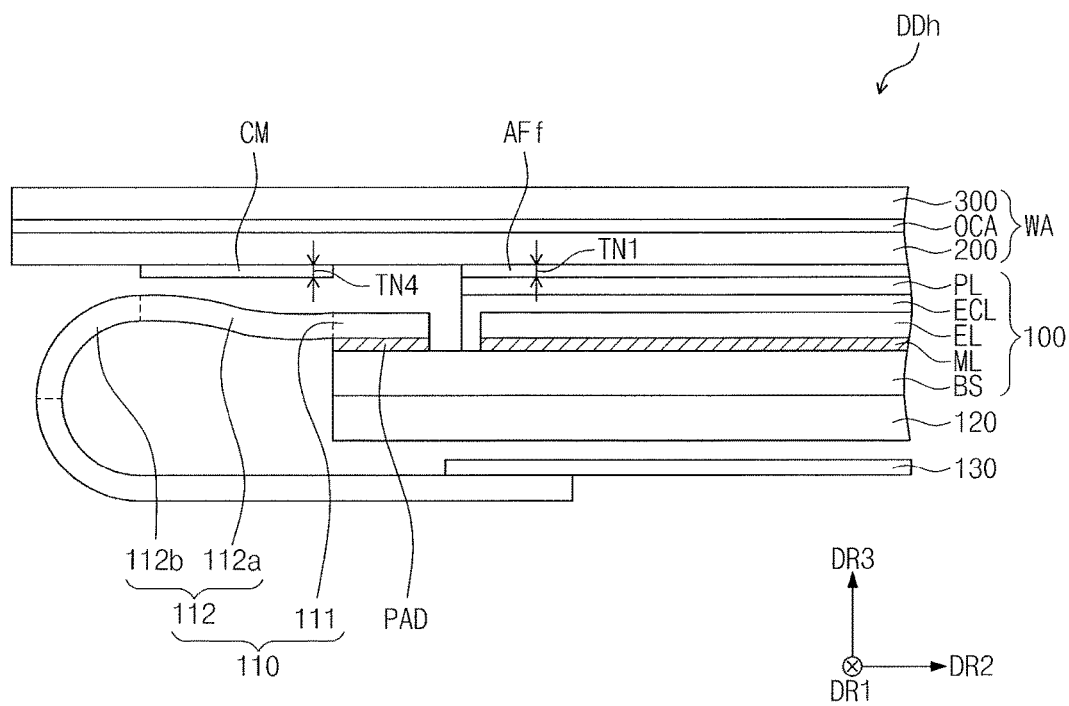
FIG. 14 illustrates a cross-sectional view of a display device according to an exemplary embodiment of the present disclosure.

FIG. 14 illustrates a cross-sectional view of a display device DDh according to an exemplary embodiment of the present disclosure. In FIG. 14, the same reference numerals denote the same elements in FIG. 3, and detailed descriptions of the same elements will be omitted.

Referring to FIG. 14, the display device DDh may include an adhesive part AFf disposed between the window assembly WA and the display panel 100 to couple the window assembly WA and the display panel 100 and a compensating part CM overlapping with the flexible printed circuit board 110 and not overlapping with the display panel 100 when viewed in a plan view.

One surface of the compensating part CM may be coupled to the window assembly WA, and a portion of the other surface facing the one surface of the compensating part CM may be exposed to the air and may face the curved part 112. In this case, the curved part 112 may move to the third direction DR3, and the curved part 112 may make contact with the compensating part CM.

The compensating part CM may include a non-adhesive material. For example, the compensating part CM may include a plastic material, such as, for example, polyimide, polyethylene terephthalate, or polyethylene naphthalate.

The compensating part CM may have a thickness TN4 equal to or greater than a thickness TN1 of the adhesive part AFf. The thickness TN4 of the compensating part CM may be determined depending on the gap between the window assembly WA and the flexible printed circuit board 110.

In the present exemplary embodiment, the compensating part CM may be overlapping with the first curved part 112a when viewed in a plan view. In an embodiment, the compensating part CM may not be overlapping with the first curved part 112a and overlapping with the second curved part 112b. According to an embodiment, the compensating part CM may be overlapping with both of the first and second curved parts 112a and 112b.

Figure 15:
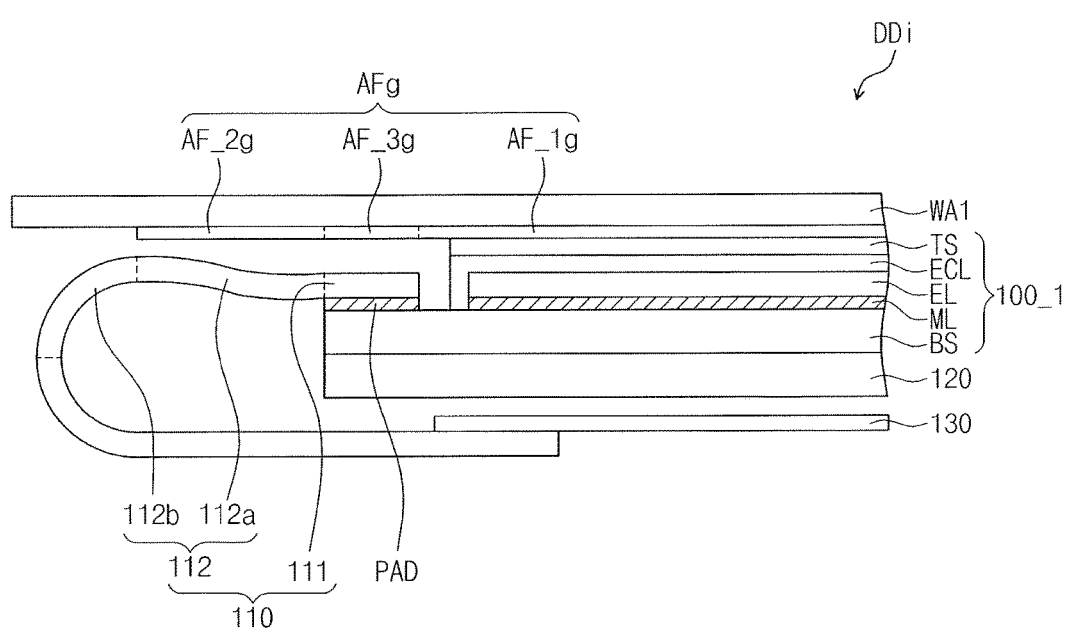
FIG. 15 illustrates a cross-sectional view of a display device according to an exemplary embodiment of the present disclosure.

FIG. 15 illustrates a cross-sectional view of a display device DDi according to an exemplary embodiment of the present disclosure.

Referring to FIG. 15, the display device DDi may include a window assembly WA1, a display panel 100_1, a flexible printed circuit board 110, and an adhesive film AFg.

In the present exemplary embodiment, the display panel 100_1 may include a base substrate BS, a circuit layer ML, an organic light emitting diode layer EL, an encapsulation layer ECL, a pan part PAD, and a touch part TS. The touch part TS may be directly disposed on the encapsulation layer ECL.

The window assembly WA1 may include a base member and a black matrix. The base member may include a silicon substrate, a glass substrate, or a plastic film. The black matrix may be disposed on a rear surface of the base member to define a bezel area, i.e., the non-display area NDR (refer to FIG. 1), of the display device DDi.

An adhesive film AFg may be disposed between the window assembly WA1 and the display panel 100_1. The adhesive film AFg may include an adhesive part AF_1g, a compensating part AF_2g, and a connecting part AF_3g.

One surface of each of the adhesive part AF_1g, the compensating part AF_2g, and the connecting part AF_3g may be attached to the window assembly WA1. The other surface of the adhesive part AF_1g, which may face the one surface of the adhesive part AF_1g attached to the window assembly WA1, may be attached to the touch part TS. The other surface of the compensating part AF_2g, which may face the one surface of the compensating part AF_2g attached to the window assembly WA1, may be exposed to the air to face the curved part 112, e.g., may face the curved part 112.

According to the present exemplary embodiment, the gap between the window assembly WA1 and the flexible printed circuit board 110 may be easily compensated by extending the adhesive film AFg without adding a separate material or process. Therefore, although an external force may be applied to the flexible printed circuit board 110 bent when the cover member 400 is assembled, variations in position and shape of the flexible printed circuit board 110 may be reduced. As a result, defects may be prevented from occurring on the flexible printed circuit board 110 and reliability of the display device DDi may be improved.

Figure 16:
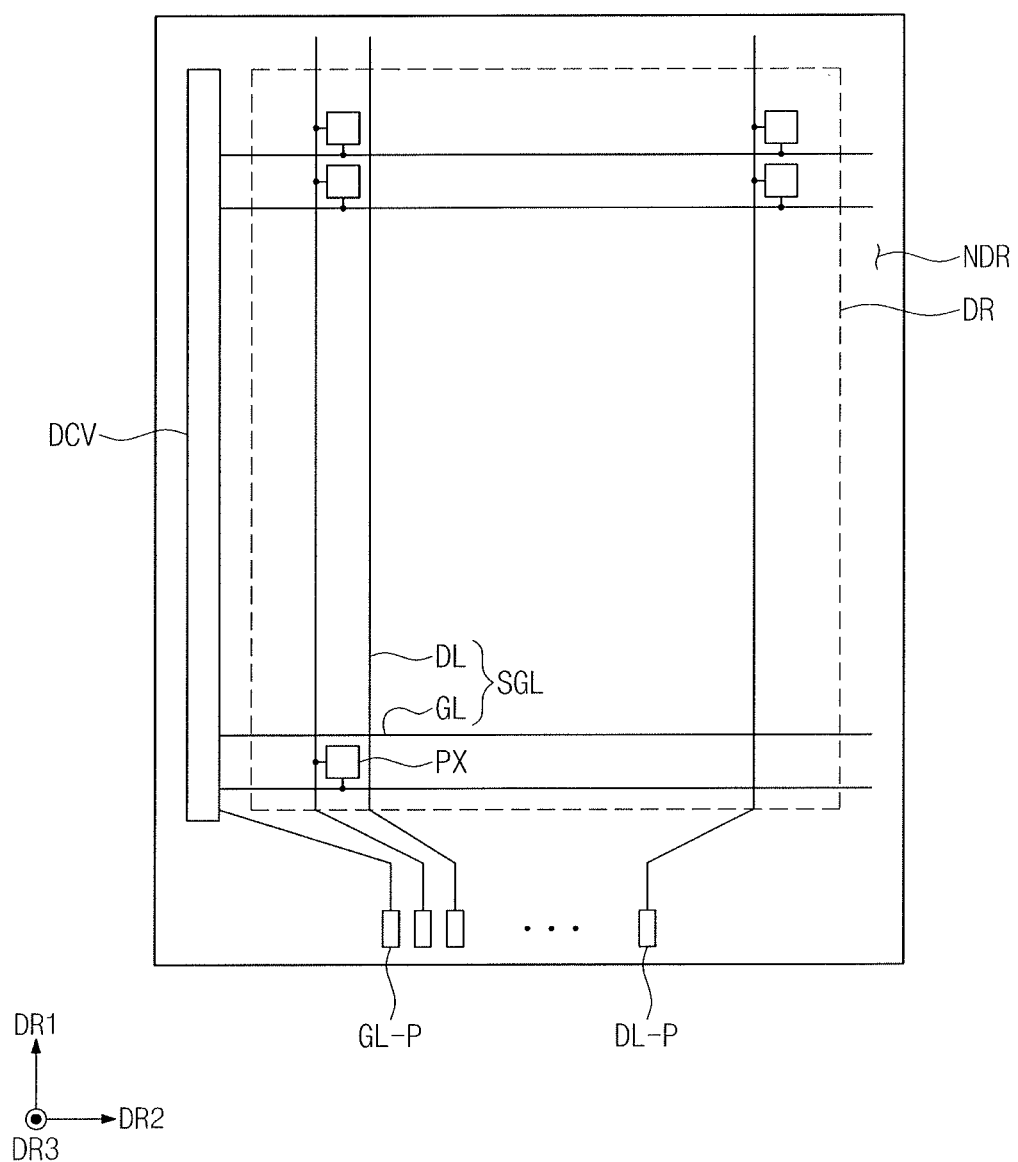
FIG. 16 illustrates a plan view of a display panel according to an exemplary embodiment of the present disclosure.
Figure 17:
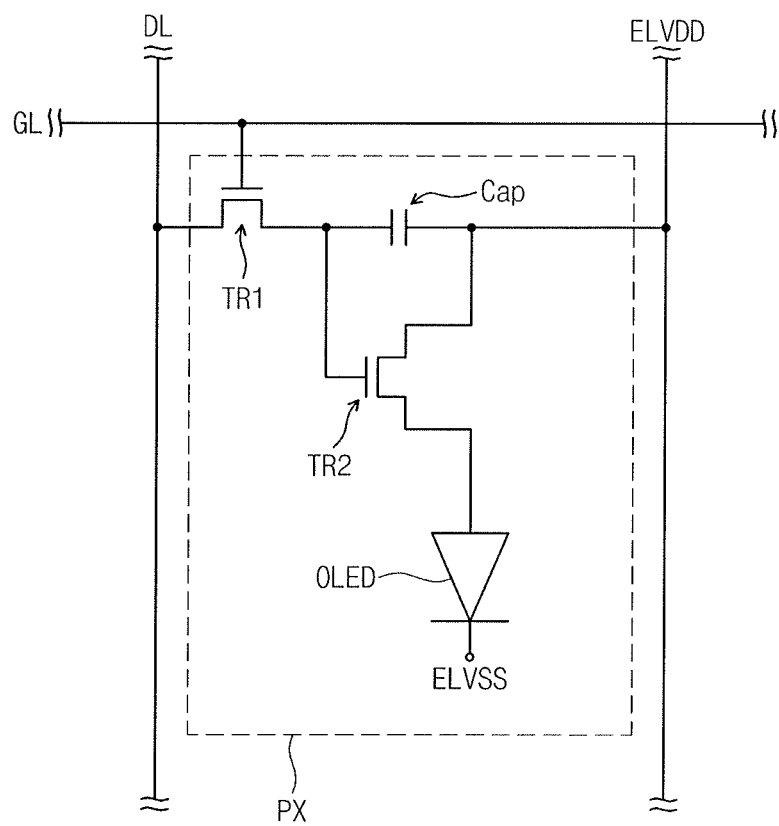
FIG. 17 illustrates an equivalent circuit diagram of a pixel according to an exemplary embodiment of the present disclosure.

FIG. 16 illustrates a plan view of a display panel according to an exemplary embodiment of the present disclosure and FIG. 17 illustrates an equivalent circuit diagram of a pixel according to an exemplary embodiment of the present disclosure.

Referring to FIGS. 3, 16, and 17, the circuit layer ML may include a plurality of signal lines SGL, thin film transistors TR1 and TR2, at least one capacitor Cap, and a gate driving circuit DCV disposed at one side of the non-display area NDR.

The signal lines SGL include gate lines GL and data lines DL. Each of the gate lines GL may be connected to a corresponding pixel of the pixels PX and each of the data lines DL may be connected to a corresponding pixel of the pixels PX. The gate lines GL may extend in a second direction DR2 and may be arranged in a first direction DR1, and the data lines DL may extend in the first direction DR1 and may be arranged in the second direction DR2.

The pad part PAD may include gate pads GL-P and data pads DL-P. The gate pads GL-P may be electrically connected to the gate lines GL and the data pads DL-P may be electrically connected to the data lines DL. The gate pads GL-P and the data pads DL-P, which may be disposed in the non-display area NDR, may be coupled to the attaching part 111 of the flexible printed circuit board 110.

The organic light emitting diode layer EL may include display elements. The organic light emitting diode layer EL may include an organic light emitting diode OLED of the pixel PX. The organic light emitting diode layer EL may further include organic layers to assist the organic light emitting diode.

The display panel 100 may receive a first source voltage ELVDD and a second source voltage ELVSS from an external source. Each pixel PX may be turned on in response to a corresponding gate signal of gate signals. Each pixel PX may receive the first and second source voltages ELVDD and ELVSS and may generate a light in response to a corresponding data signal of data signals.

By way of summation and review, a display device may include a display panel, a driving circuit board driving the display panel, and a flexible printed circuit board electrically connecting the display panel and the driving circuit board. When a cover member is coupled to the display panel, an external force may be applied to the flexible printed circuit board, and the flexible printed circuit board may be deformed. Due to, for example, the deformation of the flexible printed circuit board, lines arranged on the flexible printed circuit board may be cracked.

The present disclosure provides a display device that may be capable of reducing defects and a portable terminal that may be capable of reducing defects.

According to embodiments, a gap between a window assembly and a flexible printed circuit board may be compensated by extending an adhesive film. Therefore, although an external force may be applied to the flexible printed circuit board bent when the cover member is assembled, variations in position and shape of the flexible printed circuit board may be reduced. As a result, defects may be prevented from occurring on the flexible printed circuit board and reliability of the display device may be improved.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a display panel that displays an image;
a flexible printed circuit board including an attaching part attached to the display panel and a curved part extending from the attaching part to outside of the display panel when viewed in a plan view;
a window assembly on the display panel;
an adhesive part between the window assembly and the display panel to couple the display panel and the window assembly; and
a compensating part extending with a same thickness as the adhesive part from the adhesive part between the window assembly and the display panel to the outside of the display panel when viewed in a plan view such that the compensating part overlaps the curved part.

2. The display device as claimed in claim 1, wherein:
a first surface of the compensating part is coupled to the window assembly, and
a second surface of the compensating part, which faces the first surface, is exposed to air and faces the curved part.

3. The display device as claimed in claim 1, wherein the compensating part includes a non-adhesive material.

4. The display device as claimed in claim 1, wherein the compensating part includes a same material as the adhesive part.

5. The display device as claimed in claim 1, wherein a shortest distance between the curved part and the compensating part is smaller than a distance between the attaching part and the window assembly.

6. The display device as claimed in claim 1, wherein the compensating part is spaced apart from the curved part.

7. The display device as claimed in claim 1, wherein the window assembly includes:
a window member; and
a touch panel between the window member and the display panel, a first surface of the adhesive part is attached to the touch panel, and a second surface of the adhesive part is attached to the display panel.

8. The display device as claimed in claim 1, wherein the display panel includes:
a base substrate;
a pad part on one surface of the base substrate and electrically connected to the flexible printed circuit board;
an organic light emitting diode layer on the base substrate;
an encapsulation layer sealing the organic light emitting diode layer to expose the pad part; and
a touch part on the encapsulation layer, and the adhesive part is between the window assembly and the touch part to couple the display panel and the window assembly.

9. The display device as claimed in claim 1, wherein:
the display panel further includes an optical member facing the window assembly, and
the adhesive part is between the optical member and the window assembly to couple the display panel and the window assembly.

10. A display device, comprising:
a display panel that displays an image;
a flexible printed circuit board including an attaching part attached to the display panel and a curved part extending from the attaching part and not overlapping the display panel;
a window assembly on the display panel;
an adhesive part between the window assembly and the display panel to couple the display panel and the window assembly;
a compensating part not overlapping the display panel and overlapping the curved part; and
a connecting part between the adhesive part and the compensating part to connect the adhesive part and the compensating part, the connecting part overlapping the attaching part when viewed in a plan view, wherein the adhesive part, the connecting part, and the compensating part are integrally formed as a single unit.

11. The display device as claimed in claim 10, wherein the adhesive part, the connecting part, and the compensating part are an optically clear adhesive film.

12. The display device as claimed in claim 10, wherein the curved part includes:
a first curved part that is closer to the window assembly as a distance from the display panel increases; and a second curved part that is farther away from the window assembly as the distance from the display panel increases, and the compensating part overlapping one or more of the first curved part or the second curved part when viewed in plan view.

13. The display device as claimed in claim 12, wherein a first distance between the attaching part and the connecting part is greater than a second distance between the first curved part and the compensating part.

14. The display device as claimed in claim 12, wherein a boundary part at which the first curved part meets the second curved part is attached to the compensating part.

15. The display device as claimed in claim 12, wherein:
the curved part further includes a third curved part between the first curved part and the second curved part, and
the third curved part is attached to the compensating part.

16. A portable terminal, comprising:
a display panel;
a flexible printed circuit board having a contacting part attached to a first surface of the display panel and a bending part bent to a second surface of the display panel;
a window assembly on the display panel;
an adhesive part between the display panel and the window assembly to couple the display panel and the window assembly; and
a compensating part being coupled to the window assembly and overlapping the bending part of the flexible printed circuit board, wherein
at least one portion of the bending part of the flexible printed circuit board is closer to the window assembly than the contacting part of the flexible printed circuit board.

17. The portable terminal as claimed in claim 16, wherein the flexible printed circuit board is spaced apart from the compensating part.

18. The portable terminal as claimed in claim 16, wherein the compensating part and the adhesive part are connected to each other to have a single unit shape.

19. The portable terminal as claimed in claim 16, wherein the compensating part does not overlap the display panel when viewed in a plan view.

20. A display device, comprising:
a display panel;
a flexible printed circuit board having a contacting part attached to a first surface of the display panel and a bending part bent to a second surface of the display panel;
a touch panel on the display panel;
a window member on the touch panel;
an adhesive part between a window assembly, including the touch panel and the window member, and the display panel to couple the display panel and the window assembly; and
a compensating part not overlapping with the display panel, overlapping with the bending part, and on a same layer as the contacting part, wherein
the adhesive part and the compensating part have a same material as each other.

21. The display device as claimed in claim 20, wherein a distance between the flexible printed circuit board and the adhesive film changes with a distance from the display panel.

22. The display device as claimed in claim 20, wherein a portion of the flexible printed circuit board, which does not overlap the display panel when viewed in a plan view, is attached to the adhesive part.

23. The display device as claimed in claim 20, wherein the flexible printed circuit board is spaced apart from the adhesive part.

24. A display device, comprising:
a display panel configured to display an image;
a flexible printed circuit board including an attaching part attached to the display panel and a curved part extending from the attaching part, the attaching part overlapping with the display panel and the curved part extending from the attaching part to outside of the display panel when viewed in a plan view;
a window assembly on an upper surface of the display panel;
an adhesive film including an adhesive part and a compensating part extending from the adhesive part,
wherein the adhesive part is disposed between the window assembly and the display panel and overlaps with the display panel when viewed in a plan view,
wherein the compensating part overlaps with the curved part when viewed in a plan view, and
wherein the adhesive part and the compensating part have a same thickness and a same material, and are disposed on a same layer.

25. The display device as claimed in claim 24, wherein:
a first surface of the compensating part is coupled to the window assembly, and
a second surface of the compensating part, which faces the first surface, is exposed to air and faces the curved part.

26. The display device as claimed in claim 24, wherein the adhesive part and the compensating part are an optically clear adhesive film.

27. The display device as claimed in claim 24, wherein the window assembly comprises:
a window member; and
a touch panel between the window member and the display panel,
wherein a first surface of the adhesive part is attached to the touch panel, and a second surface of the adhesive part is attached to the display panel.

28. The display device as claimed in claim 24, wherein the display panel comprises an optical member facing the window assembly,
wherein a first surface of the adhesive part is attached to the window assembly, and a second surface of the adhesive part is attached to the optical member.

* * * * *